(12) United States Patent
Takeuchi

(10) Patent No.: US 11,570,361 B2
(45) Date of Patent: Jan. 31, 2023

(54) LENS UNIT, IMAGING DEVICE, CONTROL METHODS THEREOF, AND STORAGE MEDIUM

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 473 days.

(21) Appl. No.: 16/676,037

(22) Filed: Nov. 6, 2019

(65) Prior Publication Data
US 2020/0154051 A1    May 14, 2020

(30) Foreign Application Priority Data

Nov. 8, 2018 (JP) .............................. JP2018-210924

(51) Int. Cl.
*H04N 5/232* (2006.01)
*G02B 27/64* (2006.01)
*G06T 7/254* (2017.01)

(52) U.S. Cl.
CPC ....... *H04N 5/23267* (2013.01); *G02B 27/646* (2013.01); *H04N 5/23287* (2013.01); *G06T 7/254* (2017.01); *G06T 2207/20201* (2013.01)

(58) Field of Classification Search
CPC ........... H04N 5/23248; H04N 5/23251; H04N 5/23258; H04N 5/23264; H04N 5/23267; H04N 5/2328; H04N 5/23287; G02B 27/64; G02B 27/646; G03B 2217/005; G03B 2205/0007; G06T 7/254; G06T 2207/20201

See application file for complete search history.

(56) References Cited

U.S. PATENT DOCUMENTS

2016/0173781 A1* 6/2016 Tsuchiya ............ H04N 5/23267
348/208.7

FOREIGN PATENT DOCUMENTS

| JP | 2007-052235 A | 3/2007 |
| JP | 2015-194711 A | 11/2015 |
| JP | 2016-114792 A | 6/2016 |

* cited by examiner

*Primary Examiner* — Clayton E. LaBalle
*Assistant Examiner* — Fang-Chi Chang
(74) *Attorney, Agent, or Firm* — Cowan, Liebowitz & Latman, P.C.

(57) ABSTRACT

A lens unit comprises a shake detector; a shake correction mechanism for correcting image blur; a setting unit for setting a ratio of shake to be corrected by the shake correction mechanism; a control unit for, based on the shake detected by the shake detector and the ratio of shake, calculating a first shake correction amount and control an image shake correction operation by the shake correction mechanism; and a target-value correction unit for correcting the first shake correction amount, based on a difference between a result of detecting shake by the shake detector, and a result of detecting shake by a shake detector provided in the imaging device, wherein the control unit controls the shake correction mechanism based on an image stabilization amount corrected in accordance with the target-value correction unit.

18 Claims, 11 Drawing Sheets

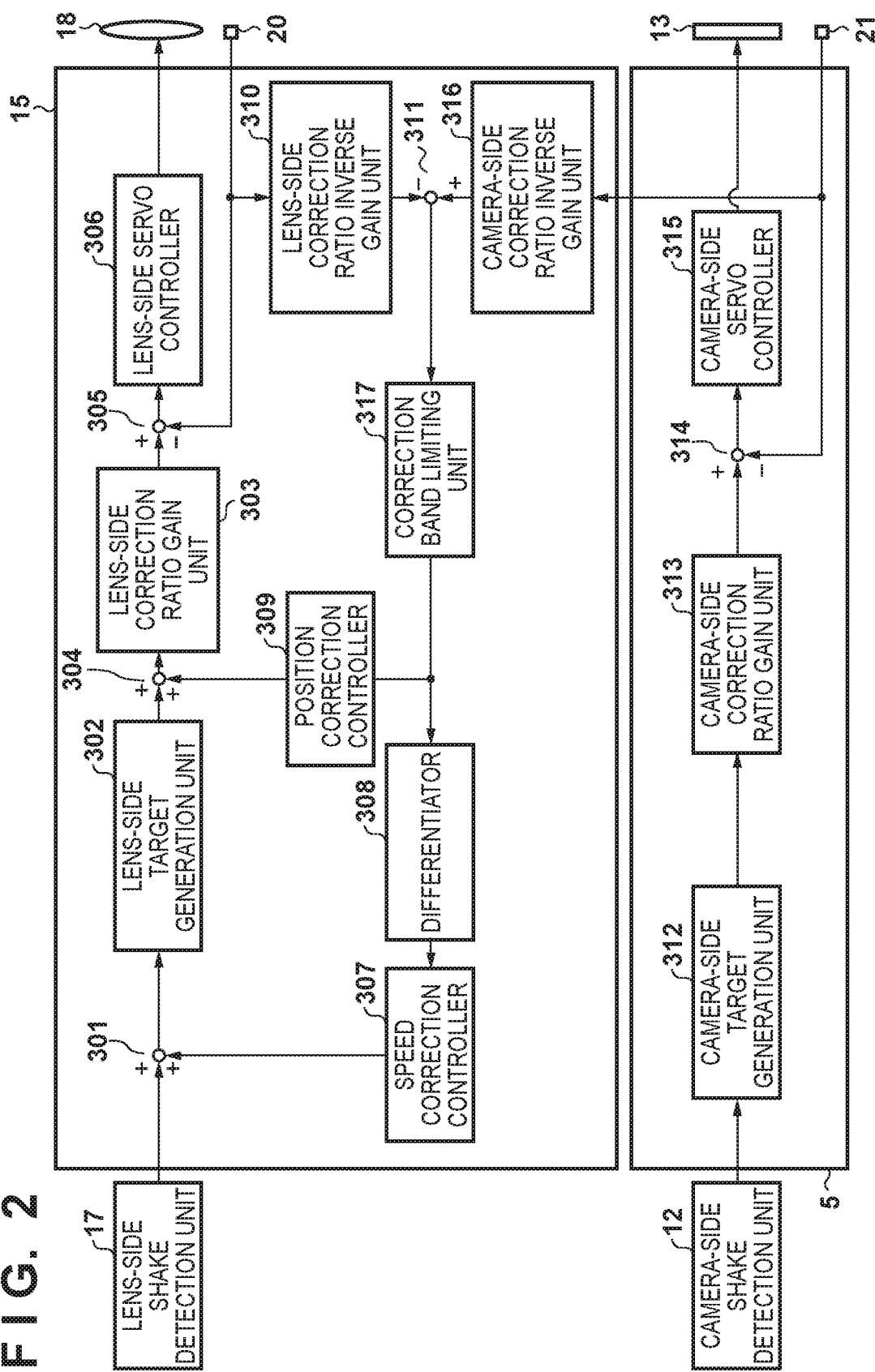

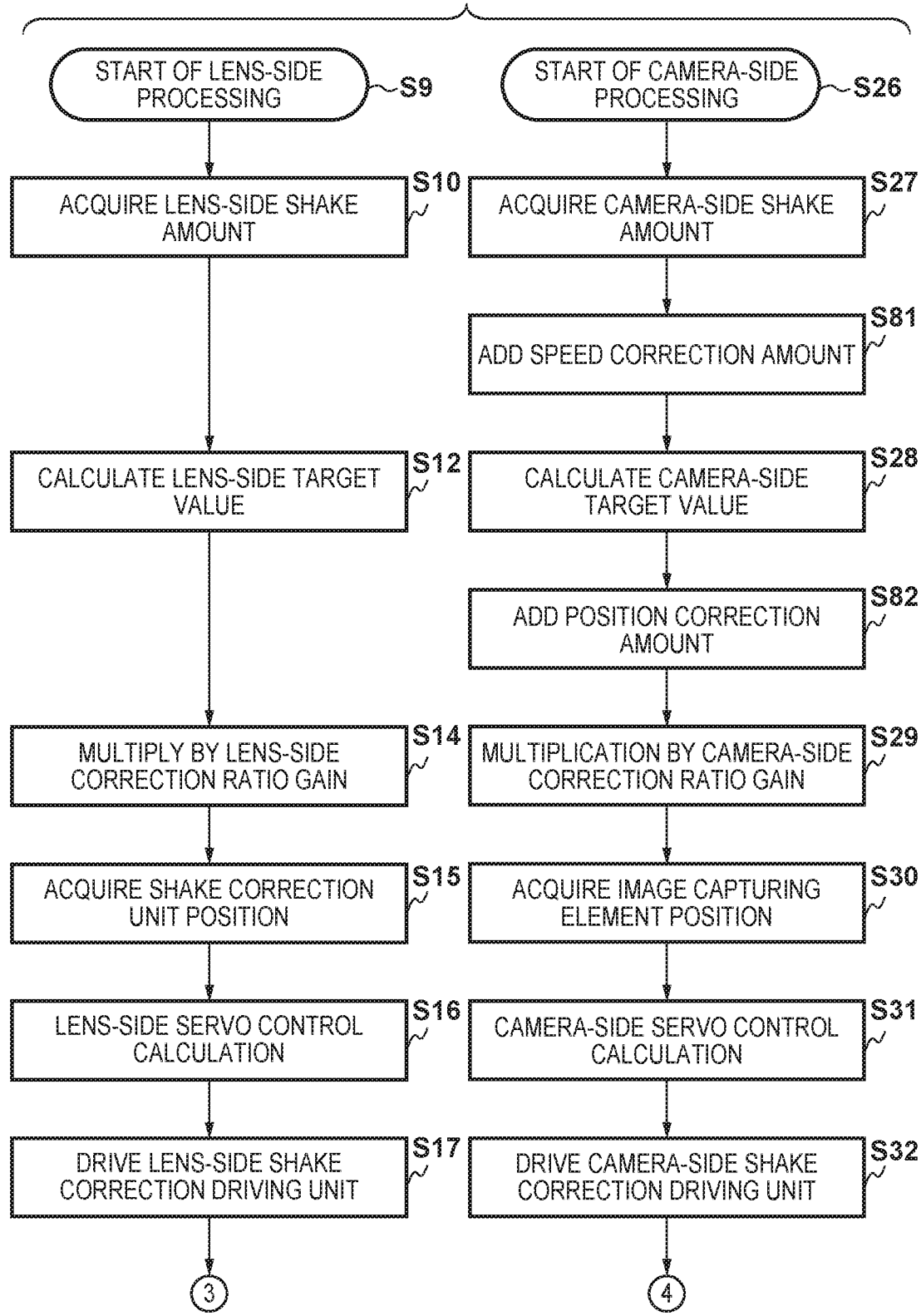

LENS UNIT, IMAGING DEVICE, CONTROL METHODS THEREOF, AND STORAGE MEDIUM

BACKGROUND OF THE INVENTION

Field of the Invention

The present invention relates to an imaging device having a plurality of image stabilization means.

Description of the Related Art

In recent years, in conjunction with miniaturization of imaging devices and increase in magnification of optical systems, an influence of shaking of the imaging device on an image, such as with hand-shake, has become significant. In order to cope with this problem, various imaging devices have been proposed which have a function of correcting image blur caused by shaking of the device such as camera shake (hereinafter referred to as an image stabilization function).

In the case of a lens interchangeable camera, there has been proposed a camera in which a means for detecting shake is provided in at least one of an interchangeable lens and a camera body, and an image stabilization means is provided in at least one of the interchangeable lens and the camera body.

For example, Japanese Patent Laid-Open No. 2015-194711 discloses an interchangeable lens camera system that includes both a mechanism (a shake correction lens mechanism) for performing image stabilization by decentering a part of an image capturing optical system, and an image plane shake correction mechanism. With this technique, the information of a shake detection unit provided in the interchangeable lens or the camera body is separated into low frequency and high frequency shake signals, and shake correction amounts for the shake correction lens mechanism and the image plane shake correction mechanism are calculated. One of the shake correction lens mechanism and the image plane shake correction mechanism performs shake correction with a high frequency shake correction signal, and the other of the shake correction lens mechanism and the image plane shake correction mechanism performs shake correction with a low frequency shake correction signal. By separating the shake signal into high frequency and low frequency and performing shake correction by a plurality of shake correction means, the influence of time delay associated with communication of a shake correction amount between the interchangeable lens and the body in the interchangeable lens camera is reduced. Further, by simultaneously driving a plurality of shake correction means to enlarge a shake correction stroke, it is possible to handle a larger shake and to improve shake correction performance.

In the case of an interchangeable lens camera disclosed in Japanese Patent Laid-Open No. 2007-52235, both of an interchangeable lens and a body have a shake correction member and a shake detection unit. Image stabilization is performed by simultaneously driving each shake correction member at a constant shake correction rate in accordance with the shake detected by each shake detection unit.

However, in the case of the shake correction apparatus disclosed in Japanese Patent Laid-Open No. 2015-194711, it is necessary to speed up the communication cycle to some extent in order to reduce the influence of the time delay accompanying the communication of the shake correction amount between the interchangeable lens and the body as much as possible. In addition, it is necessary to determine the cut-off frequency of a low-pass filter for separating the shake correction target value for driving each correction member into a low frequency and a high frequency so that the occurrence of phase delay due to communication is reduced as much as possible. This causes design constraints.

In the case of the interchangeable lens camera disclosed in Japanese Patent Laid-Open No. 2007-52235, each shake correction member is driven based on the shake amount detected by a separate shake detection unit. Therefore, when there is a characteristic difference such as a variation in sensitivity of the shake detection unit or a difference in low-frequency shake detection performance, when both shake correction members are driven, there is a problem that each shake correction member is not driven at a predetermined correction ratio, and the shake correction performance is lowered.

SUMMARY OF THE INVENTION

The present invention has been made in view of the above-mentioned problems, and provides an imaging device having an image stabilization function which is hardly affected by a performance difference between shake detection units of an interchangeable lens and a camera body.

According to a first aspect of the present invention, there is provided a lens unit that can be attached to and detached from an imaging device, the lens unit comprising: a shake detector configured to detect shake; a shake correction mechanism configured to correct image blur due to the shake; and at least one processor or circuit configured to function as the following units; a setting unit configured to set a ratio of shake to be corrected by the shake correction mechanism out of the shake detected by the shake detector; a control unit configured to, based on the shake detected by the shake detector and the ratio of shake that is set by the setting unit, calculate a first shake correction amount and control an image shake correction operation by the shake correction mechanism; and a target-value correction unit configured to correct the first shake correction amount to reduce an error of the first shake correction amount, based on a difference between a result of detecting shake by the shake detector, and a result of detecting shake by a shake detector provided in the imaging device, wherein the control unit controls the shake correction mechanism based on an image stabilization amount corrected in accordance with the target-value correction unit.

According to a second aspect of the present invention, there is provided an imaging device to which a lens unit can be attached to and detached from, the imaging device comprising: a shake detector configured to detect shake; a shake correction mechanism configured to correct image blur due to the shake; and at least one processor or circuit configured to function as the following units; a setting unit configured to set a ratio of shake to be corrected by the shake correction mechanism out of the shake detected by the shake detector; a control unit configured to, based on the shake detected by the shake detector and the ratio of shake that is set by the setting unit, calculate a first shake correction amount and control an image shake correction operation by the shake correction mechanism; and a target-value correction unit configured to correct the first shake correction amount to reduce an error of the first shake correction amount, based on a difference between a result of detecting shake by the shake detector, and a result of detecting shake by a shake detector provided in the lens unit, wherein the control unit controls the shake correction mechanism based on an image stabilization amount corrected in accordance with a target-value correction unit.

According to a third aspect of the present invention, there is provided a method for controlling a lens unit that can be attached to and detached from an imaging device, the lens unit including a shake detector for detecting shake and a shake correction mechanism for correcting image blur caused by the shake, the method comprising: setting a ratio of shake to be corrected by the shake correction mechanism out of the shake detected by the shake detector; based on the shake detected by the shake detector and the ratio of shake that is set by the setting unit, calculating a first shake correction amount and controlling an image shake correction operation by the shake correction mechanism, and correcting the first shake correction amount to reduce an error of the first shake correction amount, based on a difference between a result of detecting shake by the shake detector, and a result of detecting shake by a shake detector provided in the imaging device, wherein the shake correction mechanism is controlled based on a corrected image stabilization amount.

According to a fourth aspect of the present invention, there is provided a method for controlling an imaging device to which a lens unit can be attached to and detached from, the imaging device including a shake detector for detecting shake and a shake correction mechanism for correcting image blur caused by the shake, the method comprising: setting a ratio of shake to be corrected by the shake correction mechanism out of the shake detected by the shake detector; based on the shake detected by the shake detector and the ratio of shake that is set by the setting unit, calculating a first shake correction amount and controlling an image shake correction operation by the shake correction mechanism; and correcting the first shake correction amount to reduce an error of the first shake correction amount, based on a difference between a result of detecting shake by the shake detector, and a result of detecting shake by a shake detector provided in the lens unit, wherein the shake correction mechanism is controlled based on a corrected image stabilization amount.

Further features of the present invention will become apparent from the following description of exemplary embodiments with reference to the attached drawings.

BRIEF DESCRIPTION OF THE DRAWINGS

FIG. 2 is a block diagram illustrating a configuration of a system control unit according to the first embodiment.

FIG. 3B-1 and FIG. 3B-2 are flow charts illustrating a shake correction operation sequence in the first embodiment.

FIG. 8A and FIG. 8B are flow charts illustrating a shake correction operation sequence in the second embodiment.

DESCRIPTION OF THE EMBODIMENTS

Hereinafter, embodiments of the present invention will be described in detail with reference to the attached drawings.

First Embodiment

Figure 1A:
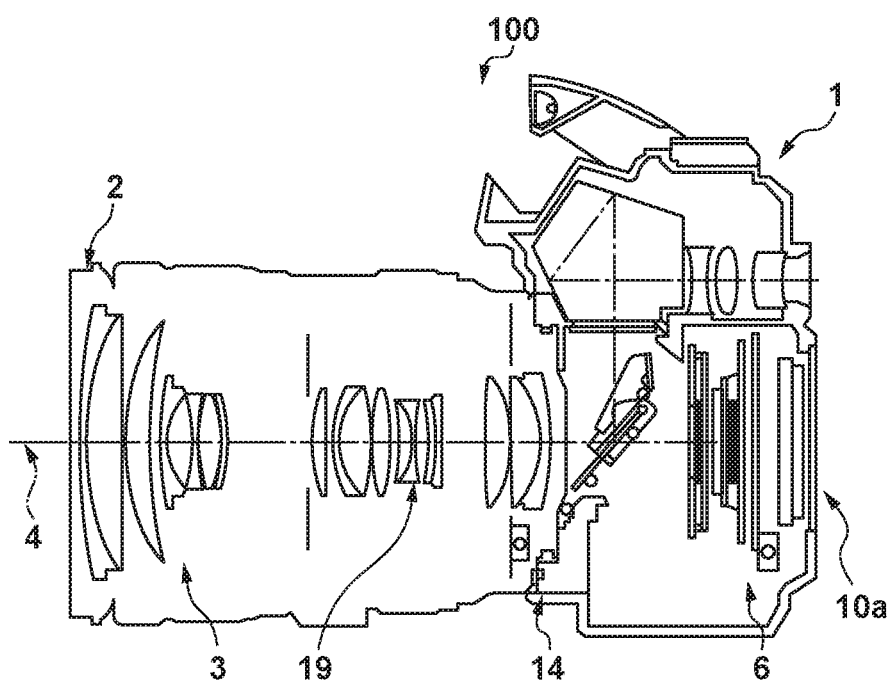
FIGS. 1A and 1B are diagrams illustrating a configuration of a lens-interchangeable single-lens reflex type camera system which is a first embodiment of an imaging device of the present invention.
Figure 1B:
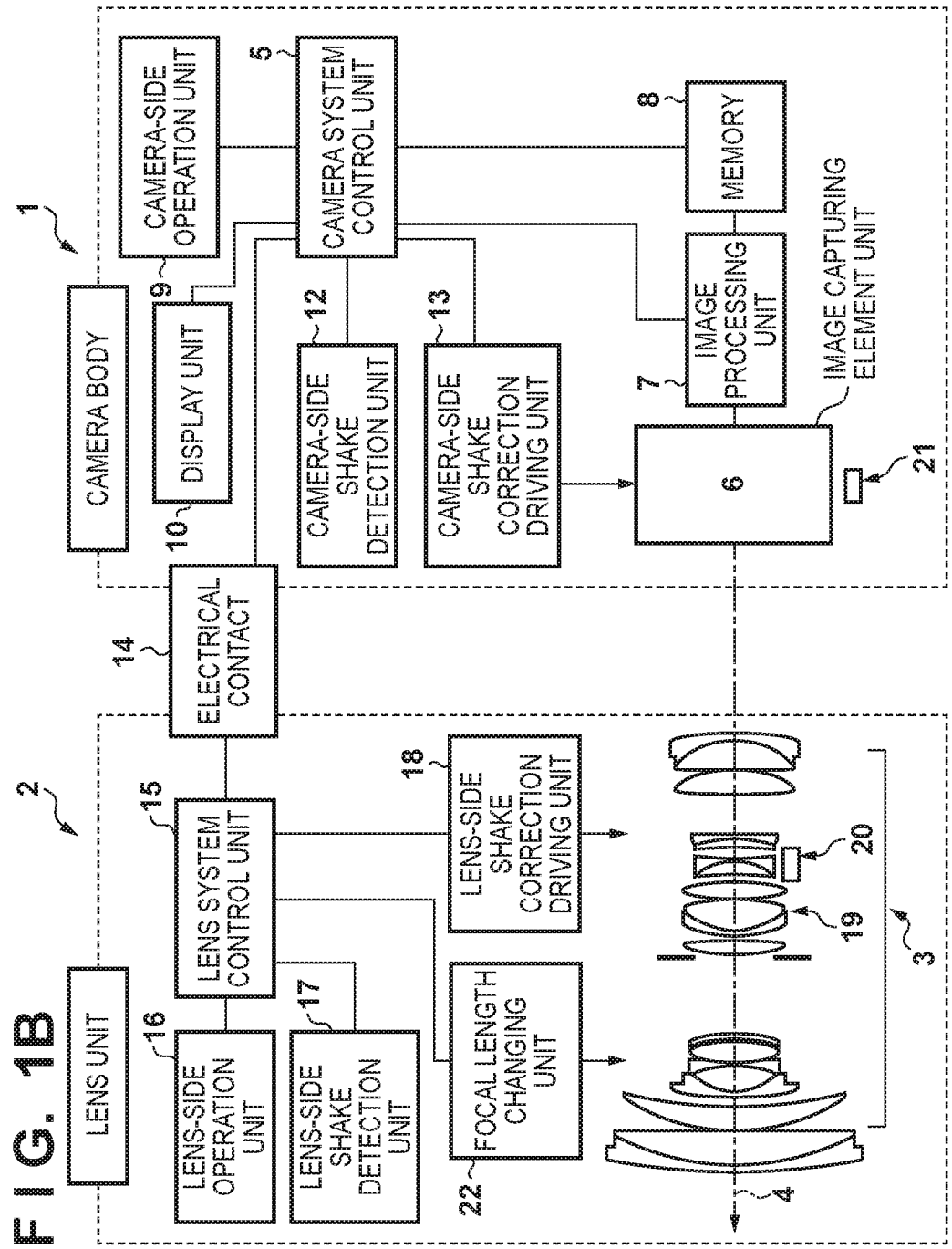

FIGS. 1A and 1B are diagrams illustrating a configuration of a lens-interchangeable single-lens reflex type camera system (imaging system) 100 which is a first embodiment of an imaging device of the present invention. FIG. 1A is a central cross-sectional view of the camera system according to the first embodiment, and FIG. 1B is a block diagram illustrating an electrical configuration of the camera system 100.

In FIG. 1A, the camera system 100 includes a camera body 1 and a lens unit 2 that is detachably mounted to the camera body 1. The lens unit 2 includes an image capturing optical system 3 comprising a plurality of lenses having an optical axis 4 as an axis, and a shake correction unit 19 for optically correcting shake of an image is provided in a part of the image capturing optical system 3. The shake correction unit 19 is a unit capable of shifting the optical axis, and can be configured by, for example, a shift lens. The camera body 1 also includes an image capturing element unit 6 and a rear display unit 10a. An electrical contact 14 for electrically connecting the camera body 1 and the lens unit 2 is disposed between the camera body 1 and the lens unit 2.

In FIG. 1B, the lens unit 2 is electrically configured to include a lens system control unit 15, a lens-side operation unit 16, a lens-side shake detection unit 17, a lens-side shake correction driving unit 18, and a focal length changing unit 22. The lens system control unit 15 controls the entirety of the lens unit 2. The lens-side operation unit 16 accepts a user operation. The lens-side shake detection unit 17 detects a shake amount of the camera system 100 (a detection result). The lens-side shake correction driving unit 18 drives the shake correction unit 19 to correct image blur. A lens position detection unit 20 detects the position of the shake correction unit 19. The focal length changing unit 22 changes the focal length of the image capturing optical system 3.

In addition, the camera body 1 includes, as electrical components, a camera system control unit 5, an image capturing element unit 6, an image processing unit 7, a memory 8, a camera-side operation unit 9, a display unit 10 including a rear display unit 10a, a camera-side shake detection unit 12, and a camera-side shake correction driving unit 13. The camera system control unit 5 controls the entirety of the camera system 100. The image capturing element unit 6 includes an image capturing element that photoelectrically converts a subject image and outputs an image signal, and a driving mechanism for causing the image capturing element to move or tilt in a direction perpendicular to the optical axis. The image processing unit 7 performs image processing required for the image signal outputted from the image capturing element of the image capturing element unit 6. The memory 8 temporarily stores image data. The camera-side operation unit 9 accepts a user operation. The display unit 10 displays a captured image, information indicating the state of the camera, and the like. The camera-side shake detection unit 12 detects a shake amount of the camera system 100. The camera-side shake correction driving unit 13 drives the image capturing element unit 6 to cause the image capturing element to move in a plane perpendicular to the optical axis 4, and thereby perform image stabilization. An image capturing element position detection unit 21 detects the position of the image capturing element in the image capturing unit 6.

When viewed from a functional point of view, the camera system 100 which comprises the camera body 1 and the lens unit 2 includes imaging means, image processing means, recording/reproduction means, and control means.

The imaging means includes the image capturing optical system 3 and the image capturing element unit 6, and the image processing means includes the image processing unit 7. The recording/reproduction means includes a memory 8 and a display unit 10. The display unit 10 includes the rear display unit 10*a*, a small display panel (not illustrated) that is for displaying shooting information and is provided on an upper surface of the camera body 1, and an electronic viewfinder (not illustrated) also called an EVF. The control means includes the camera system control unit 5, the camera-side operation unit 9, the camera-side shake detection unit 12, the camera-side shake correction driving unit 13, the lens system control unit 15, the lens-side operation unit 16, the lens-side shake detection unit 17, the lens-side shake correction driving unit 18, the lens position detection unit 20, the image capturing element position detection unit 21, and the focal length changing unit 22. In addition to the shake correction unit 19, the lens system control unit 15 also drives a focusing lens (not illustrated), an aperture, zooming, and the like.

The camera-side shake detection unit 12 and the lens-side shake detection unit 17 can detect rotational shake with respect to the optical axis 4 applied to the camera system 100, and for example, a gyro sensor or the like is used. The camera-side shake correction driving unit 13 performs driving to cause the image capturing element in the image capturing element unit 6 to tilt or shift in a plane perpendicular to the optical axis 4, and the lens-side shake correction driving unit 18 performs driving to cause the shake correction unit 19 to tilt or shift in a plane perpendicular to the optical axis 4. The respective driving units (13, 18) may also shift the respective units (6, 19) in a direction parallel to the optical axis 4, but in the present embodiment, it is assumed that movement of the respective units in the direction parallel to the optical axis 4 is not considered.

The above-described imaging means is an optical processing system for causing an image of light from an object to be formed on an imaging surface of an image capturing element via the imaging optical system 3. Since information on a focus evaluation amount/appropriate exposure amount is obtained from the image capturing element, the image capturing optical system 3 is adjusted based on this information. Thereby, object light having an appropriate amount of light can be exposed on the image capturing element in a focused state.

The image processing unit 7 includes an A/D converter, a white balance adjustment circuit, a gamma correction circuit, an interpolation calculation circuit, and the like, and generates an image for recording. A color interpolation processing unit is provided in the image processing unit 7, and performs color interpolation (demosaicing) processing from a Bayer array signal to generate a color image. The image processing unit 7 compresses still images, moving images, sounds, and the like by using a predetermined method. Further, since the image processing unit 7 can generate a shake detection signal based on comparison between a plurality of images obtained from the image capturing element, the camera-side shake detection unit 12 may be configured by the image capturing element and the image processing unit 7.

The memory 8 has an actual storage unit. The camera system control unit 5 outputs image data to the storage unit of the memory 8, and displays an image to be presented to the user on the display unit 10.

The camera system control unit 5 generates and outputs a timing signal or the like at a time of imaging. The imaging system, the image processing system, and a recording/reproducing system are controlled in accordance with an external operation. For example, the camera system control unit 5 detects pressing of a shutter release button (not illustrated) to control driving of the image capturing element in the image capturing element unit 6, operation of the image processing unit 7, compression processing, and the like. Further, the state of each segment of the display unit 10 for displaying information is controlled. The rear display unit 10*a* may have a touch panel, and may also serve as the display unit 10 and the camera-side operation unit 9.

Next, the adjustment operation of the image capturing optical system will be described. The image processing unit 7 is connected to the camera system control unit 5, and an appropriate focus position and aperture position are obtained based on a signal from the image capturing element provided in the image capturing element unit 6 and an operation of a photographer in accordance with the camera-side operation unit 9. The camera system control unit 5 issues a command to the lens system control unit 15 via the electrical contact 14, and the lens system control unit 15 controls the focal length changing unit 22 and a diaphragm driving unit (not illustrated). Further, in a mode for performing image stabilization, the camera-side shake correction driving unit 13 and the lens-side shake correction driving unit 18 are controlled based on the signals obtained from the camera-side shake detection unit 12 and the lens-side shake detection unit 17, as well as the detection information of the lens position detection unit 20 and the image capturing element position detection unit 21. The image capturing element unit 6 and the shake correction unit 19 include, for example, a driving mechanism having magnets and flat-plate coils. The lens position detection unit 20 and the image capturing element position detection unit 21 include, for example, a magnet and a Hall element.

As a specific method of controlling image stabilization, first, the camera system control unit 5 and the lens system control unit 15 receive shake signals detected by the camera-side shake detection unit 12 and the lens-side shake detection unit 17, respectively. Based on a result of this receiving, the drive amounts of the image capturing element unit 6 and the shake correction unit 19 for correcting image blur are calculated. Thereafter, the calculated driving amounts are sent as command values to the camera-side shake correction driving unit 13 and the lens-side shake correction driving unit 18, and feedback control is performed so that the positions detected by the lens position detection unit 20 and the image capturing element position detection unit 21 follow the command values. As a result, the image capturing element unit 6 and the shake correction unit 19 are respectively driven.

As described above, by controlling the operation of each unit of the camera body 1 in accordance with a user operation on the camera-side operation unit 9, it is possible to shoot still images and moving images.

Figure 3A:
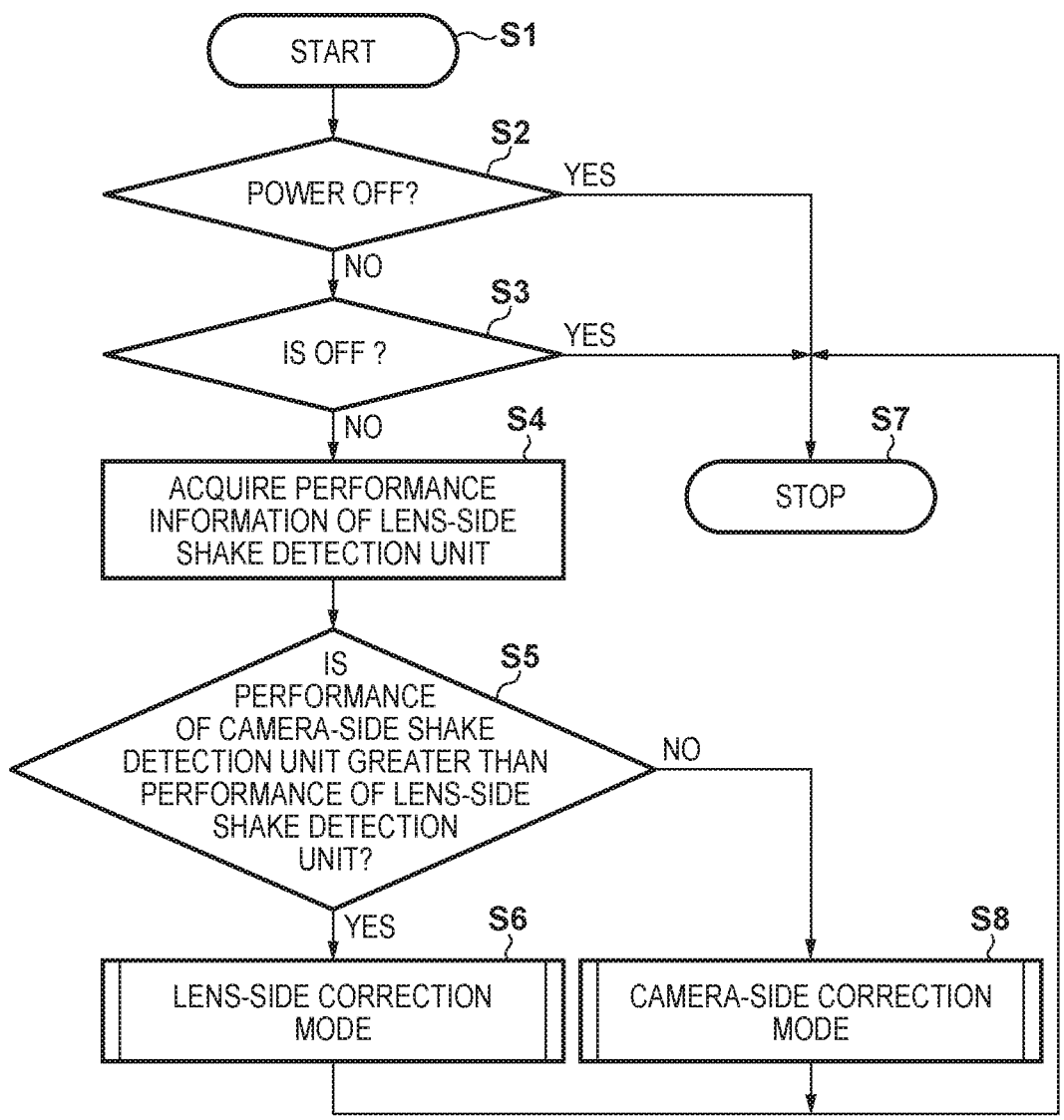
FIG. 3A is a flow chart illustrating a shake correction operation sequence in the first embodiment.
Figures 1, 3B:
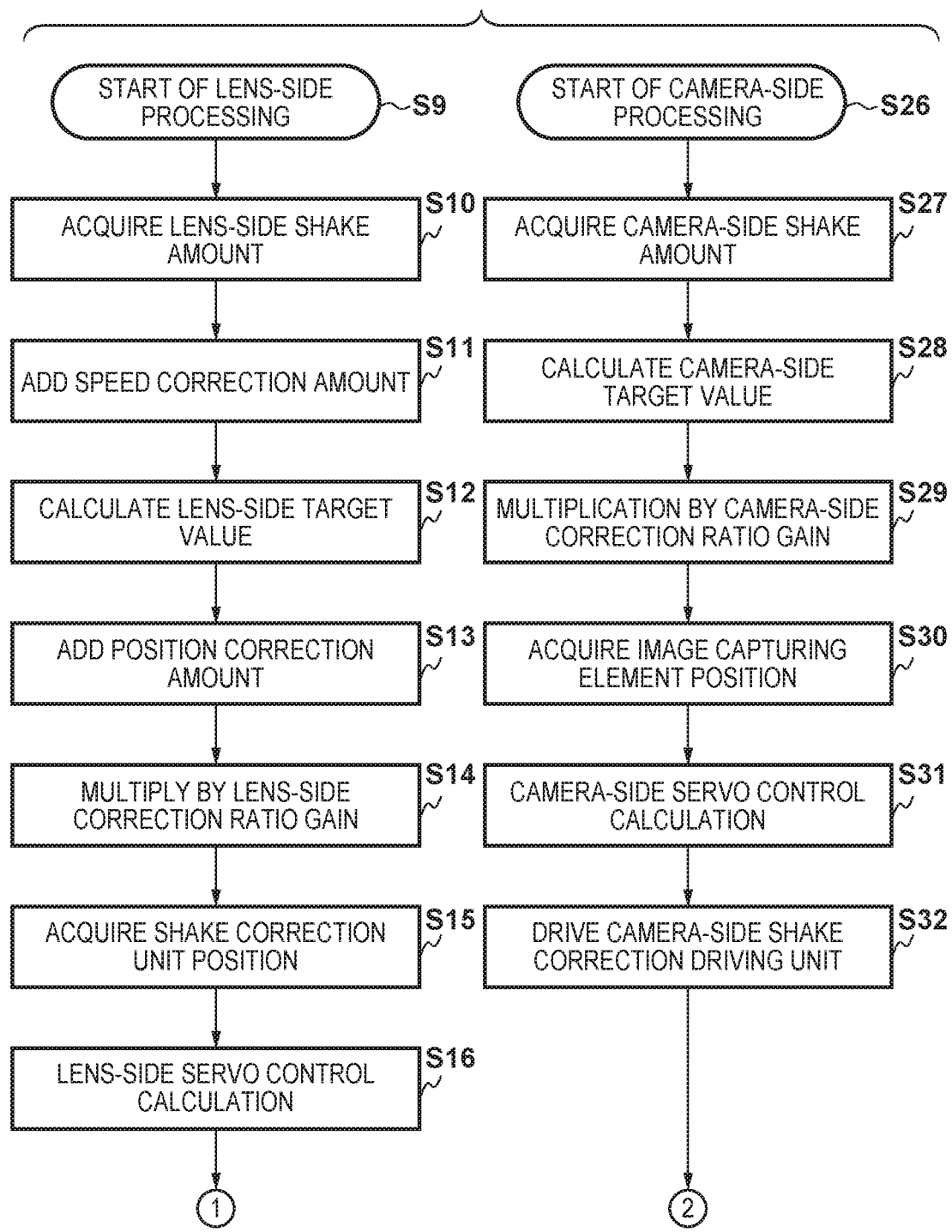
Figures 2, 3B:
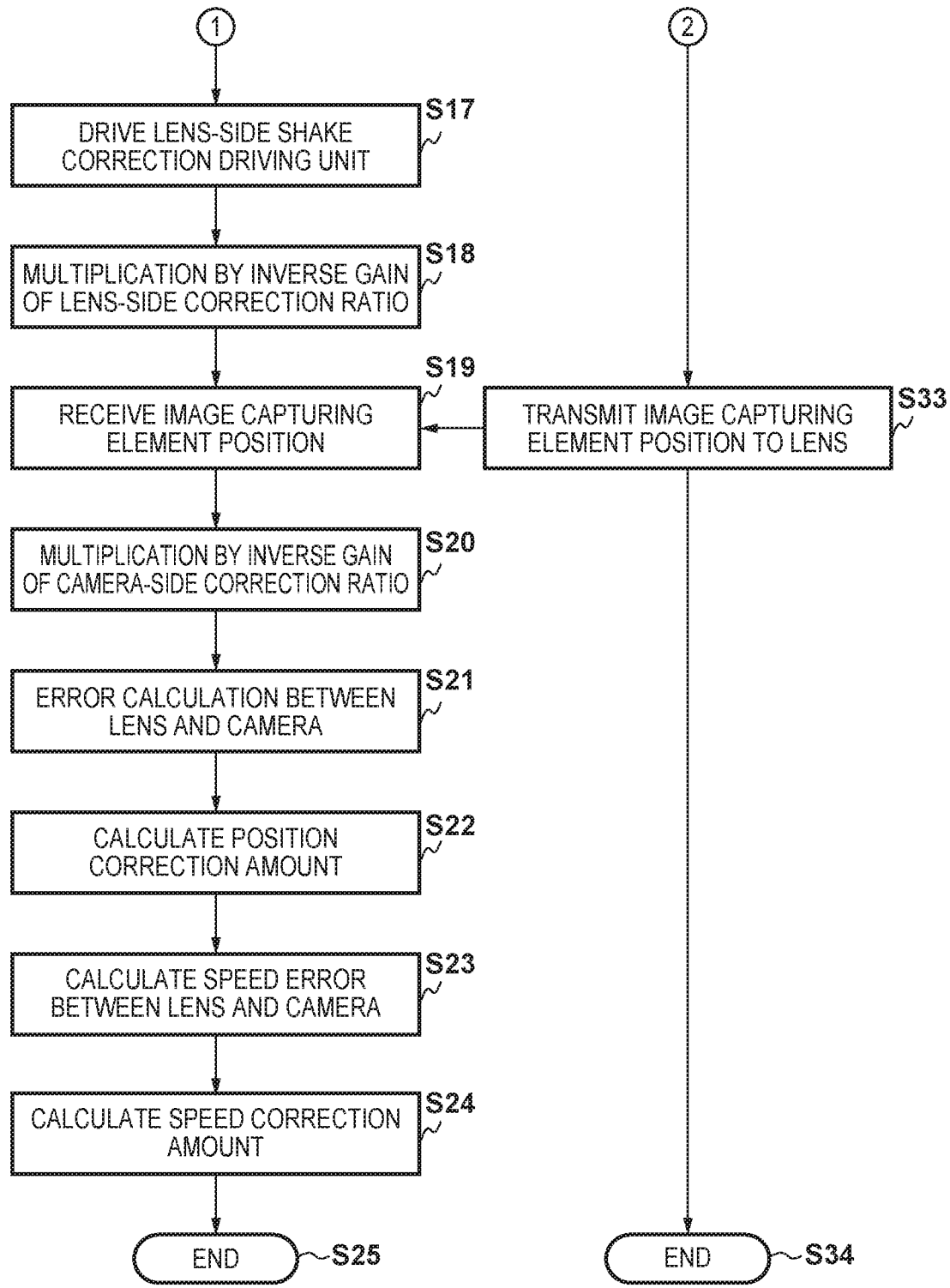

FIG. 2 is a block diagram illustrating a detailed configuration of the lens system control unit 15 and the camera system control unit 5 in the first embodiment.

In FIG. 2, the output of the lens-side shake detection unit 17 is input to the lens system control unit 15. The lens system control unit 15 includes adders 301, 304, 305, and 311, a lens-side target generation unit 302, a lens-side correction ratio gain unit 303, and a lens-side servo controller 306. The lens system control unit 15 further includes a speed correction controller 307, a differentiator 308, a position correction controller 309, a lens-side correction ratio inverse gain unit 310, a camera-side correction ratio inverse gain unit 316, and a correction band limiting unit 317. Here, the speed correction controller 307 and the position correction controller 309 are target value correction means for determining a target value correction amount, and the correction band limiting unit 317 is correction band limiting means. The lens system control unit 15 controls the lens-side shake correction driving unit 18 based on the output of the lens position detection unit 20.

In addition, the output of the camera-side shake detection unit 12 is inputted to the camera system control unit 5. The camera system control unit 5 includes a camera-side target generation unit 312, a camera-side correction ratio gain unit 313, an adder 314, and a camera-side servo controller 315. The camera system control unit 5 controls the camera-side shake correction driving unit 13 based on the output of the image capturing element position detection unit 21.

Next, a shake correction process in the imaging device configured as described above will be described. In the method of the present embodiment, the lens-side shake correction driving unit 18 and the camera-side shake correction driving unit 13 are simultaneously driven based on shake information of both the shake detection units 17 and 12 on the lens side and the camera side. Here, if the shake correction driving units 18 and 13 are driven in the same manner based on the shake information of both the shake detection units 17 and 12 on the lens side and the camera side, there is double correction with respect to the shake actually detected, and thus there is the reverse problem that the shake is caused to worsen. Therefore, the lens-side correction ratio gain unit 303 and the camera-side correction ratio gain unit 313 determine a ratio of a distribution of how much shake correction is to be respectively performed by the shake correction driving units 18 and 13 with respect to the amount of shake actually detected.

The correction ratio may be determined by both the camera system control unit 5 and the lens system control unit 15, or may be determined by one of them. When one of the lens unit 2 and the camera body 1 determine a correction ratio, the determined correction ratio is transmitted, through communication between the lens unit 2 and the camera body 1, to the other one of the lens unit 2 and the camera body 1. The other one of the lens unit 2 and the camera body 1 determines and sets a gain to be set in the correction ratio gain unit (303 or 313) based on the received correction ratio.

For example, when 50% is set to each of the lens-side correction ratio gain unit 303 and the camera-side correction ratio gain unit 313, each shake correction member performs shake correction by sharing half of the detected shake amount. Therefore, 100% of the shake correction can be performed by simultaneously driving. Note that, since it is necessary to mutually transfer various information on the lens unit 2 side and various information on the camera body 1 side therebetween, information is transferred by communication through the electrical contact 14 with the lens unit 2 side as a slave and the camera body 1 side as a master.

First, the lens system control unit 15 acquires a shake signal from the lens-side shake detection unit 17. Then, a speed correction amount calculated, by the speed correction controller 307 which is described later, from a differential value of the difference between the shake correction amount for the lens-side shake correction driving unit 18 and the shake correction amount for the camera-side shake correction driving unit 13 is subtracted by the adder 301 from the acquired shake signal. Next, angular velocity shake information output from the adder 301 is integrated by an integrator in the lens-side target generation unit 302, and the shake correction amount for the lens-side shake correction driving unit 18 is calculated.

A position correction amount calculated by the position correction controller 309, which will be described later, is subtracted by the adder 304 from the shake correction amount calculated by the lens-side target generation unit 302. The shake correction amount output from the adder 304 is multiplied with the correction ratio on the lens side by the above-mentioned lens-side correction ratio gain unit 303, and a result thereof is inputted to the adder 305 as a shake correction target value of a predetermined ratio. For the lens-side servo controller 306, position information of the shake correction unit 19 that is obtained by the lens position detection unit 20 is subtracted from the shake correction target value outputted from the adder 305 by the adder 305. Based on the signal obtained by this subtraction, a driving signal for driving the lens-side shake correction driving unit 18 is generated. In this manner, among the shake detected by the lens-side shake detection unit 17, shake of a predetermined ratio set by the lens-side correction ratio gain unit 303 is corrected by the lens-side shake correction driving unit 18. The lens-side servo controller 306 can be configured by a feedback controller such as a known PID controller.

In contrast, the camera system control unit 5 acquires a shake signal from the camera-side shake detection unit 12, and calculates a shake correction amount for the camera-side shake correction driving unit 13 by integrating angular velocity shake information by an integrator in the camera-side target generation unit 312. Furthermore, the shake correction amount calculated by the camera-side target generation unit 312 is multiplied by the camera-side correction ratio by the camera-side correction ratio gain unit 313 described above, and a result there of is inputted to the adder 314 as a shake correction target value of a predetermined ratio. The camera-side servo controller 315 subtracts the positional information of the image capturing element obtained by the image capturing element position detection unit 21 from the shake correction target value which is outputted from the adder 314. Based on the signal obtained by this subtraction, a driving signal for driving the camera-side shake correction driving unit 13 is generated. In this manner, among the shake detected by the camera-side shake detection unit 12, shake of a predetermined ratio set by the camera-side correction ratio gain unit 313 is corrected by the camera-side shake correction driving unit 13.

Here, in a case where control is performed as described above, if each of the lens-side shake detection unit 17 and the camera-side shake detection unit 12 can correctly detect the shake of the imaging device in the same manner, it is possible to satisfactorily perform shake correction by simultaneously driving the lens-side shake correction driving unit 18 and the camera-side shake correction driving unit 13 at a predetermined ratio.

However, in an actual interchangeable lens camera system, there are many cases where there is a difference in the detection performance of the lens-side shake detection unit 17 and the camera-side shake detection unit 12 depending on the combination of the lens unit 2 and the camera body 1. The difference in detection performance is, for example, a difference in output (a sensitivity difference) with respect to the same shake of each detection unit, a detection performance with respect to low-frequency shake, or the like. For example, as the detection performance for low-frequency shake, a variation of a reference value of shake output with respect to temperature change (temperature drift), a variation of a reference value of shake output in a stationary state (low-frequency output fluctuation), and the like are generally known as characteristics of an angular velocity sensor. In the case where there is a performance difference between the shake detection units mounted on the lens unit 2 and the camera body 1 as described above, when shake correction units are simultaneously driven, a problem occurs that the shake correction units are not respectively driven at a predetermined sharing ratio, and shake correction cannot be performed satisfactorily. The camera system of the present embodiment has a correction function capable of performing shake correction satisfactorily even when there is a difference in the characteristics of the shake detection units mounted on the camera body and the lens unit as described above, and this will be described in detail below.

First, the lens system control unit 15 acquires positional information of the image capturing element that is obtained from the image capturing element position detection unit 21 by communication via the electrical contact 14. Here, the acquired position information is information obtained by multiplication by a predetermined drive ratio by the camera-side correction ratio gain unit 313. Therefore, the camera-side correction ratio inverse gain unit 316 performs multiplication by the inverse of the gain value of the camera-side correction ratio gain unit 313 (performs a back calculation), thereby calculating the shake amount detected by the camera-side shake detection unit 12, and inputs the shake amount to the adder 311. Further, the lens-side correction ratio inverse gain unit 310 multiplies the position information of the shake correction unit 19 acquired by the lens position detection unit 20 by the inverse of the gain value of the lens-side correction ratio gain unit 303, thereby calculating the shake amount detected by the lens-side shake detection unit 17, and inputs the shake amount to the adder 311. The adder 311 calculates the difference value between the shake amount detected by the lens-side shake detection unit 17 and the shake amount detected by the camera-side shake detection unit 12 that are described above. This difference value is a detection error of the camera-side shake detection unit 12 and the lens-side shake detection unit 17. The calculated difference value is limited to a signal of a specific frequency band by the correction band limiting unit 317. Then, the position correction controller 309 calculates the position correction amount from the difference value of the shake amount described above, and inputs the calculated position correction amount to the adder 304.

Here, the correction band limiting unit 317 is configured by a known low-pass filter for extracting a low-frequency component from a specific signal or a band-pass filter for extracting a specific frequency component, and the frequency band to be set is changed under a predetermined condition as described later. Further, the aforementioned difference value of the shake amount is differentiated by the differentiator 308, and the difference value of the shake speed is calculated. Then, the speed correction controller 307 calculates the speed correction amount from the difference value of the shake speed described above, and inputs the calculated speed correction amount to the adder 301.

In this manner, the position correction amount calculated by the position correction controller 309 so that the aforementioned difference value of the shake amount becomes 0 is fed back through the adder 304. Furthermore, the speed correction amount calculated by the speed correction controller 307 so that the aforementioned difference value of the shake speed becomes 0 is fed back through the adder 301. As a result, the shake amount obtained by the lens-side shake detection unit 17 output from the adder 304 is corrected so as to coincide with the shake amount obtained by the camera-side shake detection unit 12.

Here, the position correction controller 309 and the speed correction controller 307 can be realized by using a feedback controller such as known proportional control or integral control. In the present embodiment, a method of using both the position correction controller 309 and the speed correction controller 307 is illustrated, but configuration may be taken to use either one.

By performing control as described above, even if a shift occurs in the shake correction target signals calculated by the lens-side target generation unit 302 and the camera-side target generation unit 312 due to a characteristic difference between the lens-side shake detection unit 17 and the camera-side shake detection unit 12, correction can be made by the correction control unit so that the target signals coincide with each other. By simultaneously driving the lens-side shake correction driving unit 18 and the camera-side shake correction driving unit 13, shake correction can be performed satisfactorily.

In the present embodiment, an example has been described in which the shake amount obtained from the lens-side shake detection unit 17 is corrected so as to coincide with the shake amount obtained from the camera-side shake detection unit 12. However, configuration may be taken to correct the shake amount obtained from the camera-side shake detection unit 12 so that it coincides with the shake amount obtained from the lens-side shake detection unit 17.

Next, the shake correction process in the present embodiment will be described with reference to the flowcharts of FIGS. 3A, 3B-1 and 3B-2. FIG. 3A is a flow chart illustrating processing of determining which of the signals calculated by the lens unit and the camera body is to be corrected. FIGS. 3B-1 and 3B-2 are flow charts illustrating shake correction processes performed by the lens-side system control unit 15 and the camera-side system control unit 5. These shake correction processes are executed in parallel. In addition, the determination processing of FIG. 3A, the processing of step S9 and subsequent steps on the lens unit side, and the processing of step S26 and subsequent steps on the camera body side of FIGS. 3B-1 and 3B-2 are repeatedly executed at a fixed cycle.

First, when the processing is started in step S1 of FIG. 3A, in step S2, the camera system control unit 5 determines whether power has been turned on by the camera-side operation unit 9. In step S2, while power is not turned on, the processing proceeds to step S7 and operation ends. When the power has been turned on, the processing proceeds to step S3.

In step S3, it is determined whether or not the shake correction function is turned off. When it is detected by the camera-side operation unit 9 that the shake correction function is turned off, the processing proceeds to step S7 and operation ends, and when the shake correction function is not turned off, the processing proceeds to step S4.

In step S4, the camera system control unit 5 acquires performance information of the lens-side shake detection unit 17. In step S5, the performance information of the lens-side shake detection unit 17 and the camera-side shake detection unit 12 are compared. When it is determined that the performance of the camera-side shake detection unit 12 is higher than the performance of the lens-side shake detection unit 17, the processing proceeds to step S6, the lens-side correction mode is set, and the operation of the lens-side correction mode is executed. Thereafter, the processing proceeds to step S7, and operation ends. Then, when it is determined that the performance of the camera-side shake detection unit 12 is lower than the performance of the lens-side shake detection unit 17, the processing proceeds to step S8, the camera-side correction mode is set, and the operation of the camera-side correction mode is executed. Thereafter, the processing proceeds to step S7, and operation ends.

Here, the performance of the shake detection unit is determined by using, for example, information on sensitivity variation of the angular velocity sensor, information on temperature drift performance or low frequency fluctuation performance, or information for identifying the angular velocity sensor such as a product model number of the angular velocity sensor as described above.

In the present embodiment, operation when the lens-side correction mode is set in step S6 will be described on the assumption that the performance of the camera-side shake detection unit 12 is higher than the performance of the lens-side shake detection unit 17. Operation when the camera-side correction mode is set in step S8 will be described in a second embodiment.

When the lens-side correction mode is set in step S6, the operation on the lens side and the operation on the camera side are started from step S9 and step S26.

In step S10, the lens-side shake amount is acquired by the lens-side shake detection unit 17. Next, in step S11, the speed correction amount calculated by the speed correction controller 307 is added to the lens-side shake amount by the adder 301. In step S12, the lens-side shake correction target value is calculated by the lens-side target generation unit 302, and in step S13, the position correction amount calculated by the position correction controller 309 is added to the lens-side shake correction target value by the adder 304.

In step S14, the lens-side correction ratio gain unit 303 multiplies the lens-side shake correction target value by the lens-side correction ratio gain, which is for determining the correction ratio of the lens-side shake correction driving unit 18, and inputs the result to the adder 305. In step S15, the position of the shake correction unit 19 is acquired by the lens position detection unit 20. In step S16, the lens-side shake correction target value generated in step S14 is compared with the position of the shake correction unit 19, and the lens-side servo controller 306 calculates a feedback control amount.

In step S17, the shake correction unit 19 is caused to move by driving the lens-side shake correction driving unit 18 in accordance with the feedback control amount calculated in step S16 to perform shake correction. Further, in step S18, by the lens-side correction ratio inverse gain unit 310 multiplying the positional information of the shake correction unit 19 by the inverse gain of the lens-side correction ratio, the shake amount in accordance with the lens-side shake detection unit 17 is calculated. Further, in step S19, the image capturing element position transmitted from the camera system control unit 5 in accordance with communication is received. In step S20, the camera-side correction ratio inverse gain unit 316 performs a multiplication by the inverse gain of the camera-side correction ratio to calculate the shake amount in accordance with the camera-side shake detection unit 12.

Further, in step S21, detection error of the shake amounts between the lens and the camera calculated in step S18 and step S20 is calculated, and in step S22, the position correction controller 309 calculates the amount of position correction such that the detection error of the shake amounts between the lens and the camera is zero. Then, an adder 304 adds a correction amount to the shake correction target value.

In step S23, the speed error of the shake amount, which is the differential value of the error of the shake amounts between the lens unit 2 and the camera body 1, is calculated by the differentiator 308. Furthermore, in step S24, the speed correction controller 307 calculates a speed correction control amount for setting the speed error of the shake amount to 0, and the adder 301 adds the correction amount to the shake amount.

As described above, by correcting the lens shake amount to coincide with the camera shake amount in accordance with the speed correction control amount and the position correction control amount, it is possible to correct the shift of the shake correction amount even in the case where shake detection units having different performances are used.

Meanwhile, in parallel with a shake correction operation on the lens side, a shake correction operation on the camera side is also performed. Starting from step S26, in step S27, the camera-side shake amount is acquired by the camera-side shake detection unit 12. Next, in step S28, the camera-side shake correction amount is calculated by integrating the camera-side shake angular velocity signal by the integrator in the camera-side target generation unit 312.

Further, in step S29, the camera-side correction ratio gain unit 313 multiplies the camera-side shake correction amount by the camera-side correction ratio for determining the correction ratio of the camera-side shake correction driving unit 13 to calculate the shake correction target position, and inputs the shake correction target position to the adder 314. In step S30, the position of the image capturing element 6 is acquired by the image capturing element position detection unit 21. In step S31, the camera-side shake correction target value generated in step S30 is compared with the position of the image capturing element 6, and the camera-side servo controller 315 calculates a feedback control amount.

In step S32, the image capturing element is caused to move by driving the camera-side shake correction driving unit 13 in accordance with the feedback control amount calculated in step S31 to perform shake correction. Furthermore, in step S33, the position of the image capturing element acquired in step S30 is transmitted to the lens unit 2 side in accordance with communication, and the camera side processing ends.

As described above, shake correction can be performed by simultaneously driving the lens-side shake correction driving unit 18 and the camera-side shake correction driving unit 13 at a predetermined ratio with respect to the shake amounts detected by the shake detection units of the lens unit 2 and the camera body 1.

Next, the relationship between the position correction amount, the speed correction amount, and the correction gain calculated in step S22 and step S24 will be described with reference to FIGS. 4A and 4B and FIG. 5. Here, as described above, since the position correction controller 309 and the speed correction controller 307 can be realized by using a known feedback controller having proportional control, integral control, or the like, the correction gain represents the gain of each correction controller.

Figure 4A:
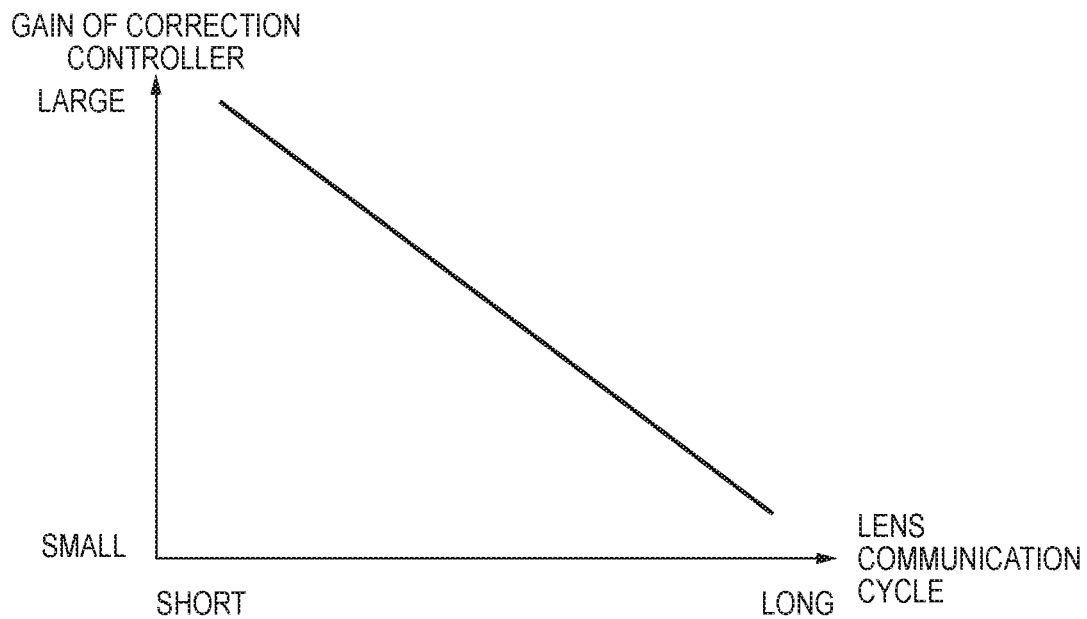
FIG. 4A and FIG. 4B are diagrams illustrating a relationship between a lens communication cycle and a gain of a correction controller or a correction band in accordance with a correction band limiting unit in the first embodiment.
Figure 4B:
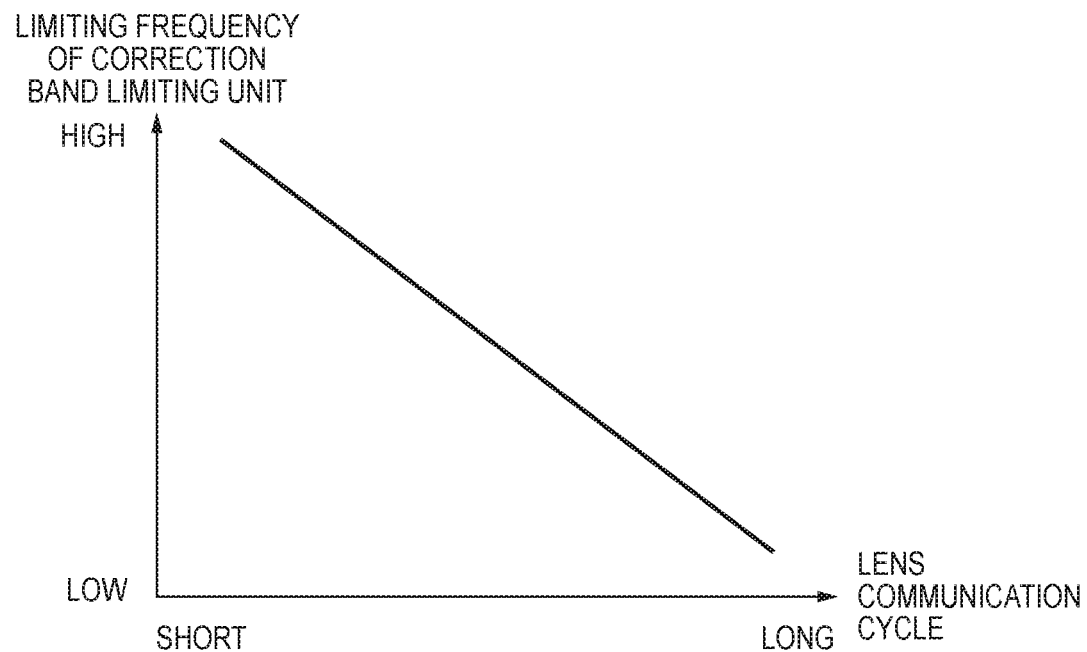

FIGS. 4A and 4B are diagrams illustrating the relationship between either the gain of the correction controller or a limiting frequency of the correction band limiting unit, and the communication cycle between the lens and the camera via the electrical contact 14, in the present embodiment. FIG. 5 is a diagram illustrating the relationship between the gain of the correction controller, and an internal temperature difference between the camera-side shake detection unit 12 and the lens-side shake detection unit 17 in the present embodiment. Settings under respective conditions will be described in order.

(Relationship Between the Correction Gain of the Correction Controllers 307 and 309 and the Communication Cycle Between the Lens and the Camera)

In the graph of FIG. 4A, the horizontal axis represents the communication cycle between the lens and the camera, and the vertical axis represents the correction gain of the position correction controller 309 and the speed correction controller 307. In the present embodiment, the correction gain decreases as the communication cycle (communication time interval) between the lens and the camera becomes longer (slower). This is to prevent a problem where, when the lens system control unit 15 obtains the position of the image capturing element in accordance with communication, if the communication cycle gets slower, the image capturing element position detection unit 21 acquires a position delayed with respect to the actual driving position. When the lens system control unit 15 acquires a position delayed with respect to the actual driving position of the camera-side shake correction driving unit 13 due to the delay in communication, when the adder 311 calculates the position shift with respect to the position of the shake correction unit 19, a phase shift occurs with respect to high frequency driving. If a position error signal whose phase is shifted is subject to feedback control by the position correction controller 309 and the speed correction controller 307, there is a concern that an operation to correct the shift of the target values of the lens and the camera cannot be correctly performed, and further, the feedback control will become unstable. Therefore, the feedback control is prevented from becoming unstable by reducing the correction gain of the position correction controller 309 and the speed correction controller 307.

(Relationship Between the Limiting Frequency of the Correction Band Limiting Unit 317 and the Communication Cycle Between the Lens and the Camera)

In the graph of FIG. 4B, the horizontal axis represents the communication cycle between the lens and the camera, and the vertical axis represents the limiting frequency of the correction band limiting unit 317. In the present embodiment, as the communication cycle between the lens and the camera becomes longer (slower), the upper limit value of frequencies to be band-limited is lowered by the correction band limiting unit 317. When the communication cycle between the lens unit and the camera body gets slower, the feedback control by the position correction controller 309 and the speed correction controller 307 becomes unstable with respect to a high-frequency shake signal due to the time delay of the position signal of the correction unit with respect to the actual driving position, and the band limiting is performed in order to prevent this. Therefore, when the communication delay between the lens and the camera is large, the band limitation is applied at a low frequency in accordance with the difference value of the shake correction amounts of the lens and the camera which are corrected by the feedback control, so that an influence of high-frequency shake is prevented.

(Relationship Between the Correction Gain of the Correction Controllers 307 and 309 and the Internal Temperature Difference of the Camera-Side/Lens-Side Shake Detection Units 17 and 12)

Figure 5:
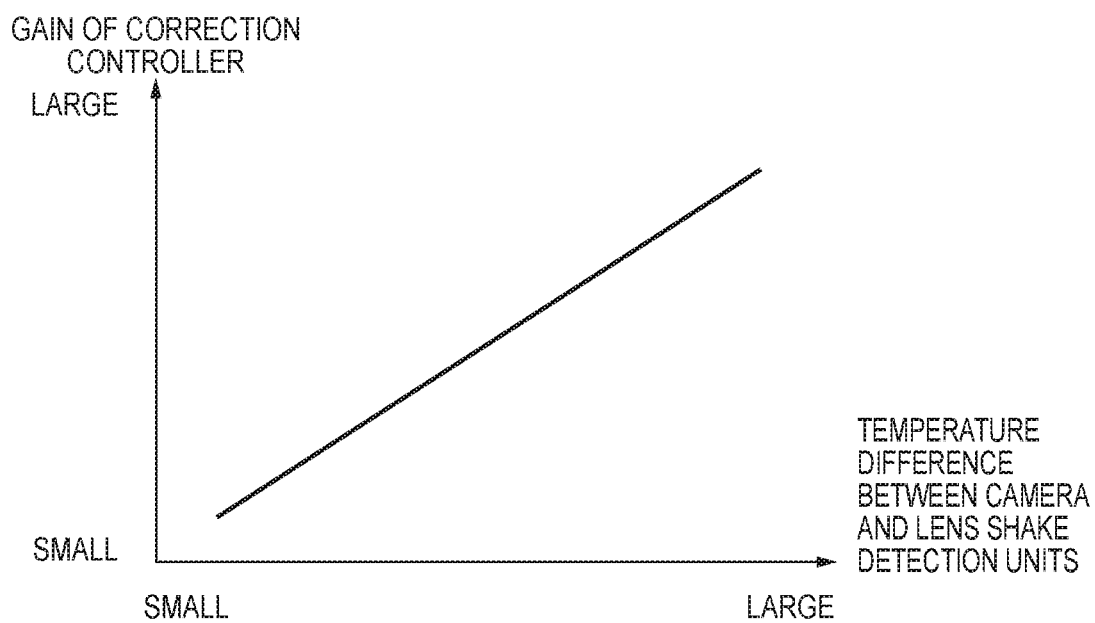
FIG. 5 is a diagram illustrating a relationship between a temperature difference between a camera-side shake detection unit and a lens-side shake detection unit and the gain of the correction controller in the first embodiment.

In the graph of FIG. 5, the horizontal axis represents an internal temperature difference between the shake detection units 17 and 12 of the lens unit 2 and the camera body 1, and the vertical axis represents the correction gain of the position correction controller 309 and the speed correction controller 307. In the present embodiment, by temperature sensors in the lens-side shake detection unit 17 and the camera-side shake detection unit 12, the temperature in and around the shake detection units is measured. As an absolute value of the temperature difference between the lens-side shake detection unit 17 and the camera-side shake detection unit 12 increases, the correction gains of the position correction controller 309 and the speed correction controller 307 increase. As a detection characteristic of a shake detection unit, it is generally known that a reference value of the shake detection unit changes in accordance with a change in the temperature environment (so-called temperature drift). If there is a difference between the temperature of each shake detection unit, the difference in the shake correction amount calculated from each shake detection unit becomes large due to the difference in an temperature drift amount. Therefore, in the present embodiment, time required for correction can be shortened by increasing the correction gains of the position correction controller 309 and the speed correction controller 307 under a condition that the temperature difference of the shake detection units is large, which increases the difference in the shake correction amounts.

Figure 6:
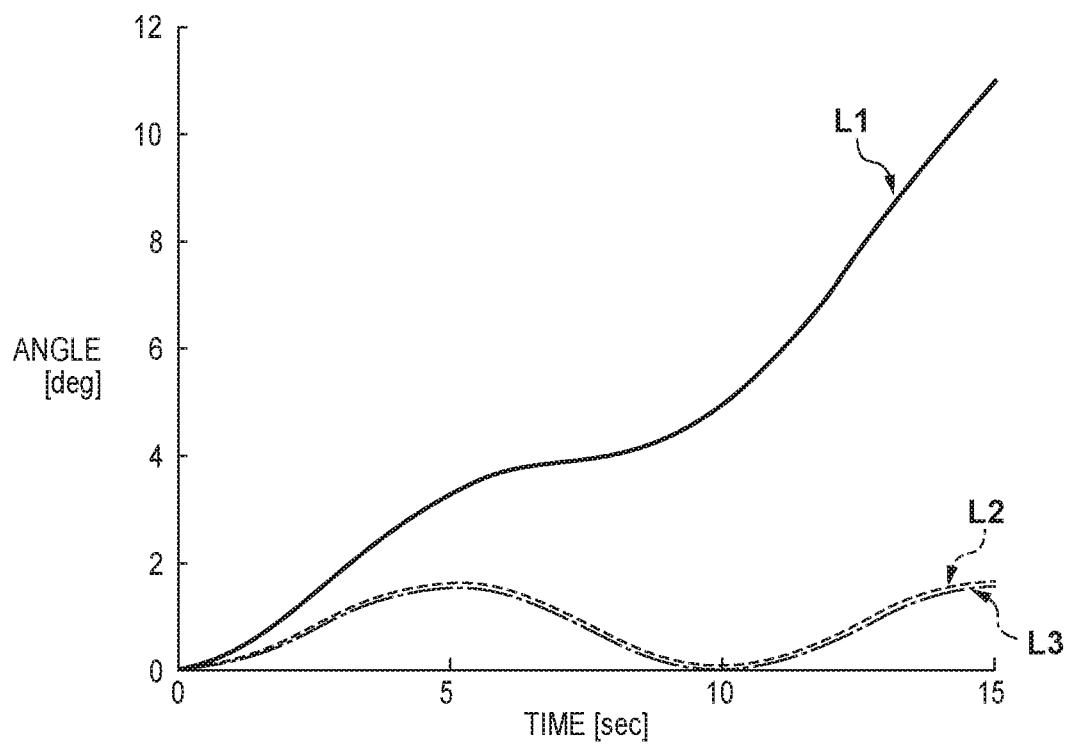
FIG. 6 is a diagram illustrating an example of shake correction signals in accordance with a lens system control unit and a camera system control unit.

Next, the effect of the present embodiment will be described with reference to FIG. 6. FIG. 6 illustrates an example of a waveform representing the effect of correction of the shake correction amount by the position correction controller 309 and the speed correction controller 307. In FIG. 6, the abscissa represents time and the ordinate represents an angle signal, and L1 represents a waveform of the shake correction amount calculated by the lens-side target generation unit 302 from the shake detected by the lens-side shake detection unit 17 in the present embodiment. In addition, L3 represents a waveform of the shake correction amount calculated by the camera-side target generation unit 312 from the shake detected by the camera-side shake detection unit 12. L2 represents the output value of the adder 304 in which the difference between the shake amount signal detected by the camera-side shake detection unit 12 and the shake correction amount calculated by the lens-side target generation unit 302 is corrected by the correction amounts in accordance with the position correction controller 309 and the speed controller 307.

In the present embodiment, illustration is given for a waveform example of operation when the lens-side correction mode is set in step S6 on the assumption that the performance of the camera-side shake detection unit 12 is higher than the performance of the lens-side shake detection unit 17. In the signal L1, which is the waveform of the shake correction signal calculated by the lens-side target generation unit 302 from the shake detected by the lens-side shake detection unit 17, drift occurs with the passage of time in accordance with the influence, on the shake detected by the lens-side shake detection unit 17, of variation of the reference value of the shake output in the stationary state (low-frequency output fluctuation) and variation of the reference value of the shake output with respect to the temperature (temperature drift). In contrast, since the shake correction signal L3 detected by the camera-side shake detection unit 12 has high detection accuracy for low frequency shake out of the shake detected by the camera-side shake detection unit 12, drift does not occur with the passage of time, and the shake correction amount can be calculated satisfactorily. For the L2 signal, which is a shake correction amount in which the difference between the shake amount signal detected by the camera-side shake detection unit 12 and the shake correction amount signal calculated by the lens-side target generation unit 302 is corrected by a position correction amount calculated by the position correction controller 309, it is possible to satisfactorily calculate the shake correction amount without experiencing drift, similarly to with the L3 signal.

As described above, in the present embodiment, the lens shake correction amount calculated from the lens-side shake detection unit 17 by the speed correction controller 307 and the position correction controller 309 is corrected so as to coincide with the camera shake correction amount calculated from the camera-side shake detection unit 12. Thereby, when the performance of the lens-side shake detection unit 17 is lower than the performance of the camera-side shake detection unit 12, shift of the shake correction amount calculated from each detection unit can be corrected. By simultaneously driving the lens-side shake correction driving unit 18 and the camera-side shake correction driving unit 13, shake correction can be performed satisfactorily.

Second Embodiment

Hereinafter, an imaging device according to the second embodiment of the present invention will be described with reference to FIGS. 7 and 8.

In the present embodiment, description is given regarding operation when the camera-side correction mode is set in step S8, on the assumption that the performance of the camera-side shake detection unit 12 is lower than that of the lens-side shake detection unit 17 in step S5 in FIG. 3A, in contrast to the first embodiment. Otherwise, it is similar to as in the first embodiment, and therefore only different portions will be described.

Figure 7:
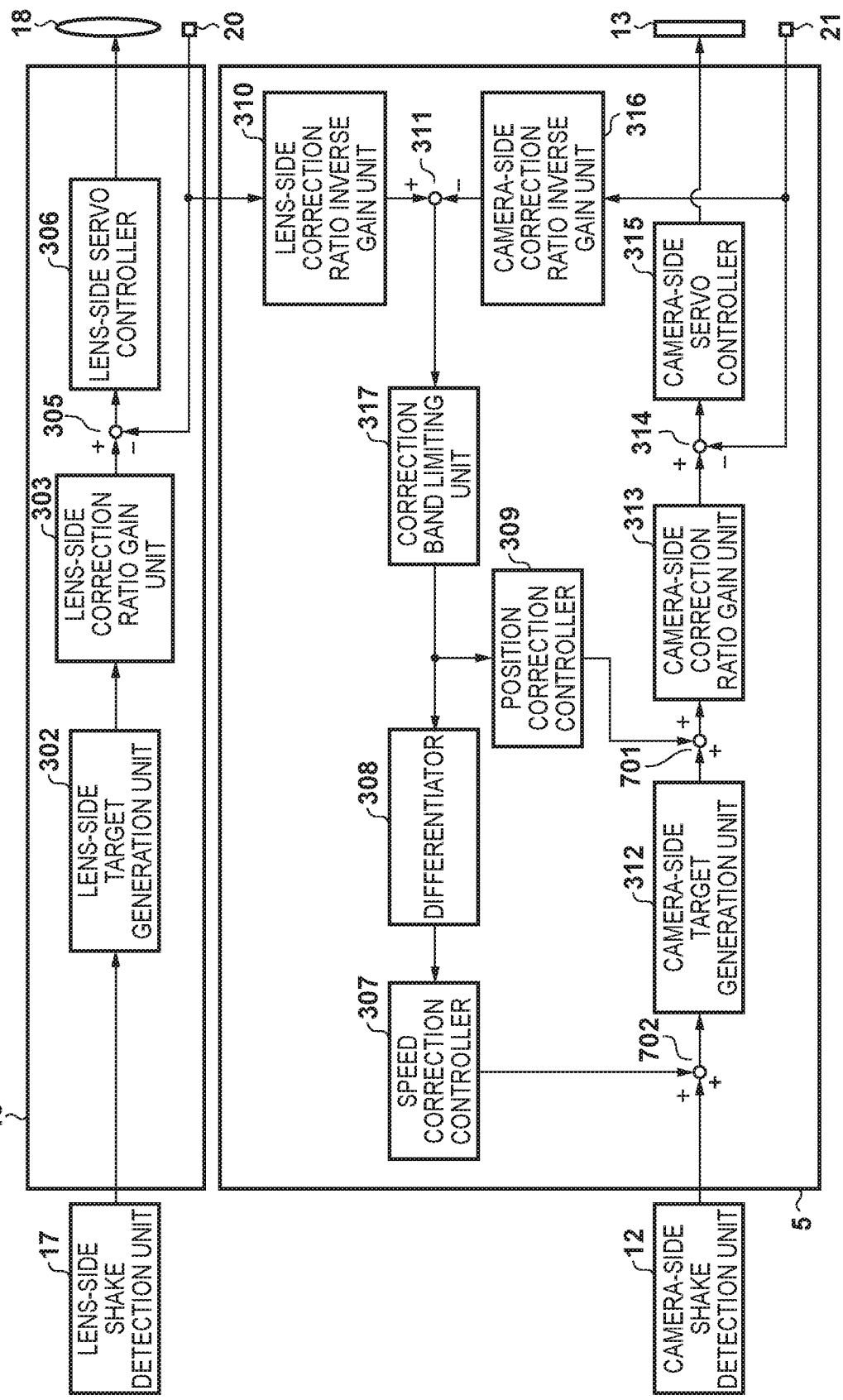
FIG. 7 is a block diagram illustrating a configuration of a system control unit according to a second embodiment.

FIG. 7 is a block diagram illustrating a detailed configuration of the lens system control unit 15 and the camera system control unit 5 in the present embodiment. Although the constituent blocks configuring the lens system control unit 15 and the camera system control unit 5 are the same, in the first embodiment, the correction amounts in accordance with the speed correction controller 307 and the position controller 309 are added to the shake amount in accordance with the lens-side shake detection unit 17, whereas in the present embodiment, the respective correction amounts are added to the shake amount in accordance with the camera-side shake detection unit 12 by the adders 702 and 701. In addition, the signs of the adder 311 are reversed. The rest is as in the first embodiment. In this way, the amount of shake detected by the camera-side shake detection unit 12 is corrected to coincide with the amount of shake detected by the lens-side shake detection unit 17.

Figure 8B:
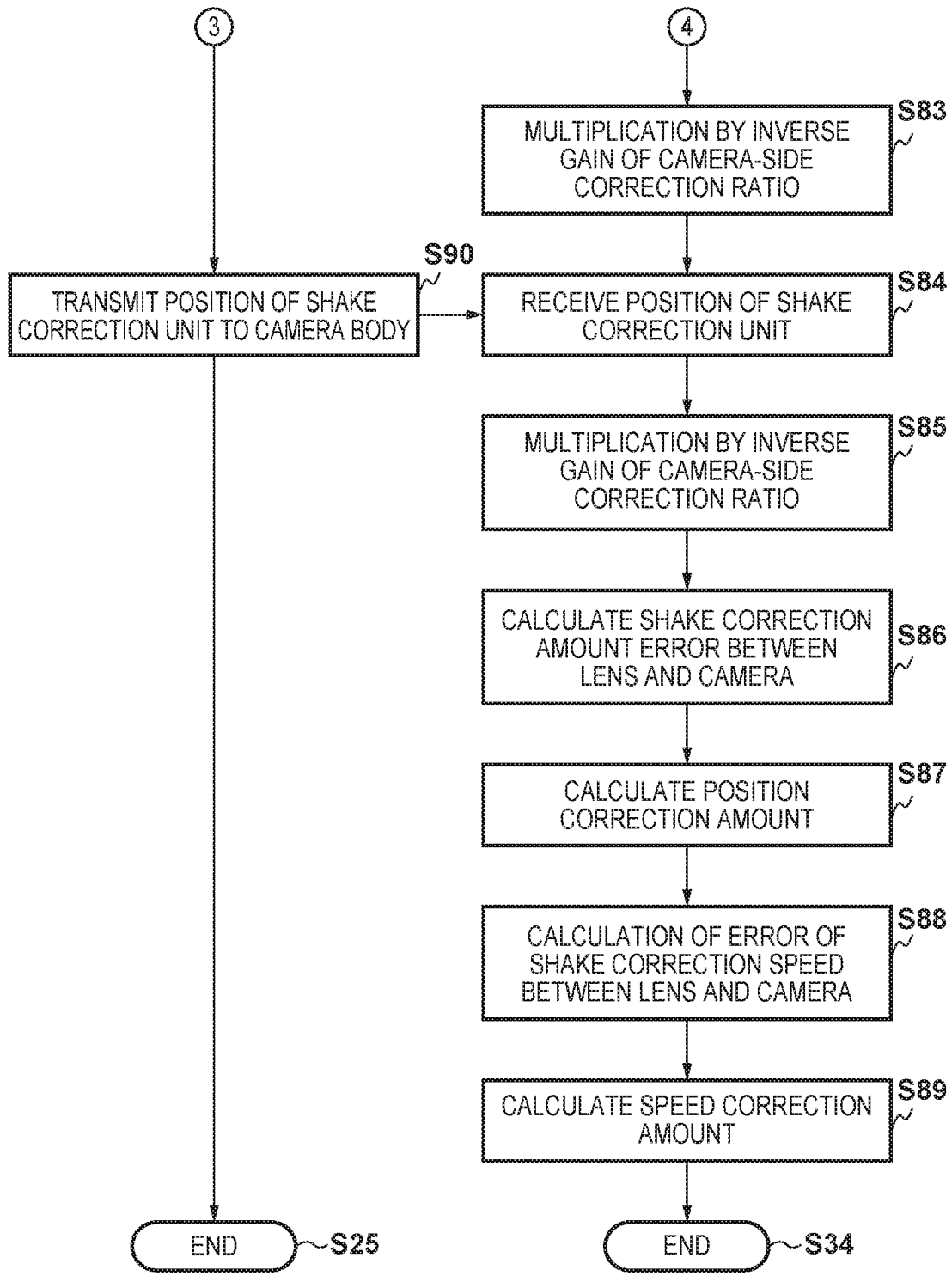

FIGS. 8A and 8B are flowcharts illustrating shake correction processing by the lens-side system control unit 15 and the camera-side system control unit 5 in the present embodiment, and these are executed in parallel. In FIGS. 8A and 8B, the addition of the correction amounts by the speed correction controller 307 and the position controller 309 has been deleted from the lens-side shake correction processing in FIGS. 3B-1 and 3B-2. The step of calculating the correction amount is also deleted. Further, in step S90, a step of transmitting the position of the shake correction unit 19 to the camera body 1 is added. In contrast, with step S81 to step S89, steps of calculating correction amounts and adding the correction amounts in accordance with the speed correction controller 307 and the position controller 309 are added to the camera-side shake correction process of FIGS. 3B-1 and 3B-2. The rest is as in the first embodiment.

As described above, in the present embodiment, the camera shake correction amount calculated from the camera-side shake detection unit 12 by the speed correction controller 307 and the position correction controller 309 is corrected so as to coincide with the lens shake correction amount calculated from the lens-side shake detection unit 17. Thereby, when the performance of the camera-side shake detection unit 12 is lower than the performance of the lens-side shake detection unit 17, shift of the shake correction amount calculated from each detection unit can be corrected. By simultaneously driving the lens-side shake correction driving unit 18 and the camera-side shake correction driving unit 13, shake correction can be performed satisfactorily.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-210924, filed on Nov. 8, 2018, which is hereby incorporated by reference herein in its entirety.

What is claimed is:

1. A lens unit that can be attached to and detached from an imaging device, the lens unit comprising:

a shake detector configured to detect shake;
a shake correction mechanism configured to correct image blur due to the shake; and
at least one processor or circuit configured to function as the following units:
a setting unit configured to set a ratio of shake to be corrected by the shake correction mechanism out of the shake detected by the shake detector;
a control unit configured to calculate a provisional shake correction amount based on the shake detected by the shake detector and the ratio of shake that is set by the setting unit, calculate a first shake correction amount by correcting the provisional shake correction amount based on the difference between the provisional shake correction amount and a second shake correction amount in the imaging device, and control an image shake correction operation by the shake correction mechanism based on the first shake correction amount.

2. The lens unit according to claim 1, wherein the control unit based on at least one of a difference in shake amounts back calculated from the difference between the provisional shake correction amount and the second shake correction amount in the imaging device, and a differential value of the difference in shake amount to correct the provisional shake correction amount.

3. The lens unit according to claim 1, wherein the at least one processor or circuit is configured to function as a communication unit configured to communicate with the imaging device, and
wherein, based on a time interval of communication by the communication unit, the control unit corrects the provisional correction amount.

4. The lens unit according to claim 1, wherein the at least one processor or circuit is configured to function as
a communication unit configured to communicate with the imaging device,
wherein the control unit calculates a target-value correction amount for correcting the provisional shake correction amount based on the difference between the provisional shake correction amount and the second shake correction amount and the result of detecting shake by the shake detector provided in the imaging device, and limits a frequency band of the target-value correction amount, and
wherein, based on a time interval of communication by the communication unit, the control unit changes an upper limit of frequencies for which to limit the frequency band.

5. The lens unit according to claim 1, further comprising a detection unit configured to detect a temperature of the shake detector, wherein the control unit corrects the provisional shake correction amount based on a temperature difference with respect to the shake detector of the imaging device.

6. The lens unit according to claim 1, wherein the control unit corrects the provisional shake correction amount when a detection accuracy of the shake detector is lower than a detection accuracy of the shake detector of the imaging device.

7. The lens unit according to claim 6, wherein the detection accuracy of the shake detector is at least one of fluctuation of sensitivity of outputs with respect to the same shake, a magnitude of variation of a reference value of an output with respect to temperature change, and a magnitude of variation of a reference value of an output in a stationary state.

8. An imaging device to which a lens unit can be attached to and detached from, the imaging device comprising:
a shake detector configured to detect shake;
a shake correction mechanism configured to correct image blur due to the shake; and
at least one processor or circuit configured to function as the following units:
a setting unit configured to set a ratio of shake to be corrected by the shake correction mechanism out of the shake detected by the shake detector;
a control unit configured to calculate a provisional shake correction amount based on the shake detected by the shake detector and the ratio of shake that is set by the setting unit, calculate a first shake correction amount by correcting the provisional shake correction amount based on the difference between the provisional shake correction amount and a second shake correction amount in the lens unit, and control an image shake correction operation by the shake correction mechanism based on the first shake correction amount.

9. The imaging device according to claim 8, wherein the control unit based on at least one of a difference in shake amounts back calculated from the difference between the provisional shake correction amount and the second shake correction amount in the lens unit, and a differential value of the difference in shake amount to correct the provisional shake correction amount for correcting the first shake correction amount.

10. The imaging device according to claim 8, wherein the at least one processor or circuit is configured to function as a communication unit configured to communicate with the lens unit, and
wherein, based on a time interval of communication by the communication unit, the control unit corrects the provisional correction amount.

11. The imaging device according to claim 8, wherein the at least one processor or circuit is configured to function as
a communication unit configured to communicate with the lens unit,
wherein the control unit calculates a target-value correction amount for correcting the provisional shake correction amount based on the difference between the provisional shake correction amount and the second shake correction amount and limits a frequency band of the target-value correction amount, and
wherein, based on a time interval of communication by the communication unit, the control unit changes an upper limit of frequencies for which to limit the frequency band.

12. The imaging device according to claim 8, further comprising a detection unit configured to detect a temperature of the shake detector, wherein the control unit corrects the provisional shake correction amount based on a temperature difference with respect to the shake detector of the lens unit.

13. The imaging device according to claim 8, wherein the control unit corrects the provisional shake correction amount when a detection accuracy of the shake detector is lower than a detection accuracy of the shake detector of the lens unit.

14. The imaging device according to claim 13, wherein the detection accuracy of the shake detector is at least one of fluctuation of sensitivity of outputs with respect to the same shake, a magnitude of variation of a reference value of an output with respect to temperature change, and a magnitude of variation of a reference value of an output in a stationary state.

15. A method for controlling a lens unit that can be attached to and detached from an imaging device, the lens unit including a shake detector for detecting shake and a shake correction mechanism for correcting image blur caused by the shake, the method comprising:
- setting a ratio of shake to be corrected by the shake correction mechanism out of the shake detected by the shake detector;
- calculating a provisional shake correction amount based on the shake detected by the shake detector and the ratio of shake that is set by the setting unit;
- calculating a first shake correction amount by correcting the provisional shake correction amount based on the difference between the provisional shake correction amount and a second shake correction amount in the imaging device; and
- controlling an image shake correction operation by the shake correction mechanism based on the first shake correction amount.

16. A method for controlling an imaging device to which a lens unit can be attached to and detached from, the imaging device including a shake detector for detecting shake and a shake correction mechanism for correcting image blur caused by the shake, the method comprising:
- setting a ratio of shake to be corrected by the shake correction mechanism out of the shake detected by the shake detector;
- calculating a provisional shake correction amount based on the shake detected by the shake detector and the ratio of shake that is set by the setting unit;
- calculating a first shake correction amount by correcting the provisional shake correction amount based on the difference between the provisional shake correction amount and a second shake correction amount in the lens unit and
- controlling an image shake correction operation by the shake correction mechanism based on the first shake correction amount.

17. A non-transitory computer-readable storage medium storing a program for causing a computer to execute each step of method for controlling a lens unit that can be attached to and detached from an imaging device, the lens unit including a shake detector for detecting shake and a shake correction mechanism for correcting image blur caused by the shake, the method comprising:
- setting a ratio of shake to be corrected by the shake correction mechanism out of the shake detected by the shake detector;
- calculating a provisional shake correction amount based on the shake detected by the shake detector and the ratio of shake that is set by the setting unit;
- calculating a first shake correction amount by correcting the provisional shake correction amount based on the difference between the provisional shake correction amount and a second shake correction amount in the imaging device; and
- controlling an image shake correction operation by the shake correction mechanism based on the first shake correction amount.

18. A non-transitory computer-readable storage medium storing a program for causing a computer to execute each step of method for controlling an imaging device to which a lens unit can be attached to and detached from, the imaging device including a shake detector for detecting shake and a shake correction mechanism for correcting image blur caused by the shake, the method comprising:
- setting a ratio of shake to be corrected by the shake correction mechanism out of the shake detected by the shake detector;
- calculating a provisional shake correction amount based on the shake detected by the shake detector and the ratio of shake that is set by the setting unit;
- calculating a first shake correction amount by correcting the provisional shake correction amount based on the difference between the provisional shake correction amount and a second shake correction amount in the lens unit; and
- controlling an image shake correction operation by the shake correction mechanism based on the first shake correction amount.

* * * * *